United States Patent [19]

Chausse

[11] 4,324,393

[45] Apr. 13, 1982

[54] HEAVY DUTY RADIATOR BENCH AND HOIST

[75] Inventor: Leon C. Chausse, Bellevue, Nebr.

[73] Assignee: Inland Manufacturing Company, Omaha, Nebr.

[21] Appl. No.: 147,936

[22] Filed: May 8, 1980

[51] Int. Cl.³ .............................................. B23Q 1/04

[52] U.S. Cl. ........................................ 269/46; 269/71; 269/152

[58] Field of Search ..................... 269/17, 71, 46, 152; 254/4 R, 124, 335-337; 212/255, 259, 261

[56] References Cited

U.S. PATENT DOCUMENTS

| | | | |
|---|---|---|---|
| 1,019,268 | 3/1912 | Melzer | 212/259 |
| 1,031,027 | 7/1912 | Reynolds | 212/259 |
| 1,344,559 | 6/1920 | Ohmacht | 269/71 |
| 3,027,158 | 3/1962 | Barbee | 269/71 |
| 3,229,830 | 1/1966 | Smith | 212/261 |

FOREIGN PATENT DOCUMENTS

| | | | |
|---|---|---|---|
| 705739 | 3/1965 | Canada | 212/261 |

*Primary Examiner*—Robert C. Watson

*Attorney, Agent, or Firm*—Allegretti, Newitt, Witcoff & McAndrews

[57] ABSTRACT

A radiator repair bench and attached hoist mechanism includes a test and repair bench with a radiator support gantry having spaced support legs pivotally attached to the top of the bench. A powered gantry support bracket pivots the gantry hoist mechanism into position over the bench or adjacent one side of the bench in order to permit gripping and subsequent movement of a radiator. In this manner, a radiator resting on the floor of a shop may be gripped by a radiator clamping assembly suspended from the gantry, raised by the gantry over the workbench and deposited on the workbench for repair and testing.

5 Claims, 5 Drawing Figures

HEAVY DUTY RADIATOR BENCH AND HOIST

BACKGROUND OF THE INVENTION

In a principal aspect, the present invention relates to an improved radiator hoist and repair mechanism and more particularly to a mechanism adapted to hoist and repair exceptionally large sized radiators.

In U.S. Pat. No. 4,216,947, a radiator hoist and repair bench mechanism is disclosed which includes a special radiator clamping device supported by a swinging hoist member mounted on a post. The clamping device grips a radiator. The hoist then raises the radiator and positions the radiator on a test and repair bench.

While the mechanism described in U.S. Pat. No. 4,216,947 is extremely useful, it has been found that exceptionally large radiators are difficult to support and move. For example, the described mechanism can become unstable if not properly operated.

In order to alleviate such instability and to increase the capability of such devices to handle extremely large sized radiators, the device of the present invention was developed.

BRIEF DESCRIPTION OF THE PREFERRED EMBODIMENT

Briefly, the present invention of an improved radiator repair bench and hoist mechanism for positioning especially large vehicle radiators includes a test and repair bench having a pivotal, two-legged gantry mounted thereon. A radiator hoist and clamp mechanism is suspended from the gantry and is adapted to clamp upon a radiator. Adjustable bracket members connect each leg of the gantry with the repair bench and pivot the gantry into a desired position to thereby position the supported radiator in a horizontal direction with respect to the test and repair bench. Vertical positioning is effected by raising and lowering the clamping mechanism supported on a cable from the gantry.

It is thus an object of the present invention to provide an improved radiator test and repair bench having a heavy duty hoist mechanism attached thereto.

Another object of the present invention is to provide a hoist mechanism associated with a radiator test and repair bench which is adapted especially for supporting and movement of extremely large radiators.

Another object of the present invention is to provide a radiator hoist mechanism for a test and repair bench which is adapted to positively grip and support a radiator and transport the radiator in a horizontal direction with respect to the repair bench with great precision.

A further object of the present invention is to provide an improved radiator bench and hoist mechanism of simplified construction which is economical to manufacture and use and which is especially adapted for use with very large sized radiators.

These and other objects, advantages and features of the invention will be set forth in the detailed description which follows.

BRIEF DESCRIPTION OF THE DRAWING

In the detailed description which follows, reference will be made to the drawing comprised of the following figures.

DETAILED DESCRIPTION OF THE PREFERRED EMBODIMENT

Figure 1:
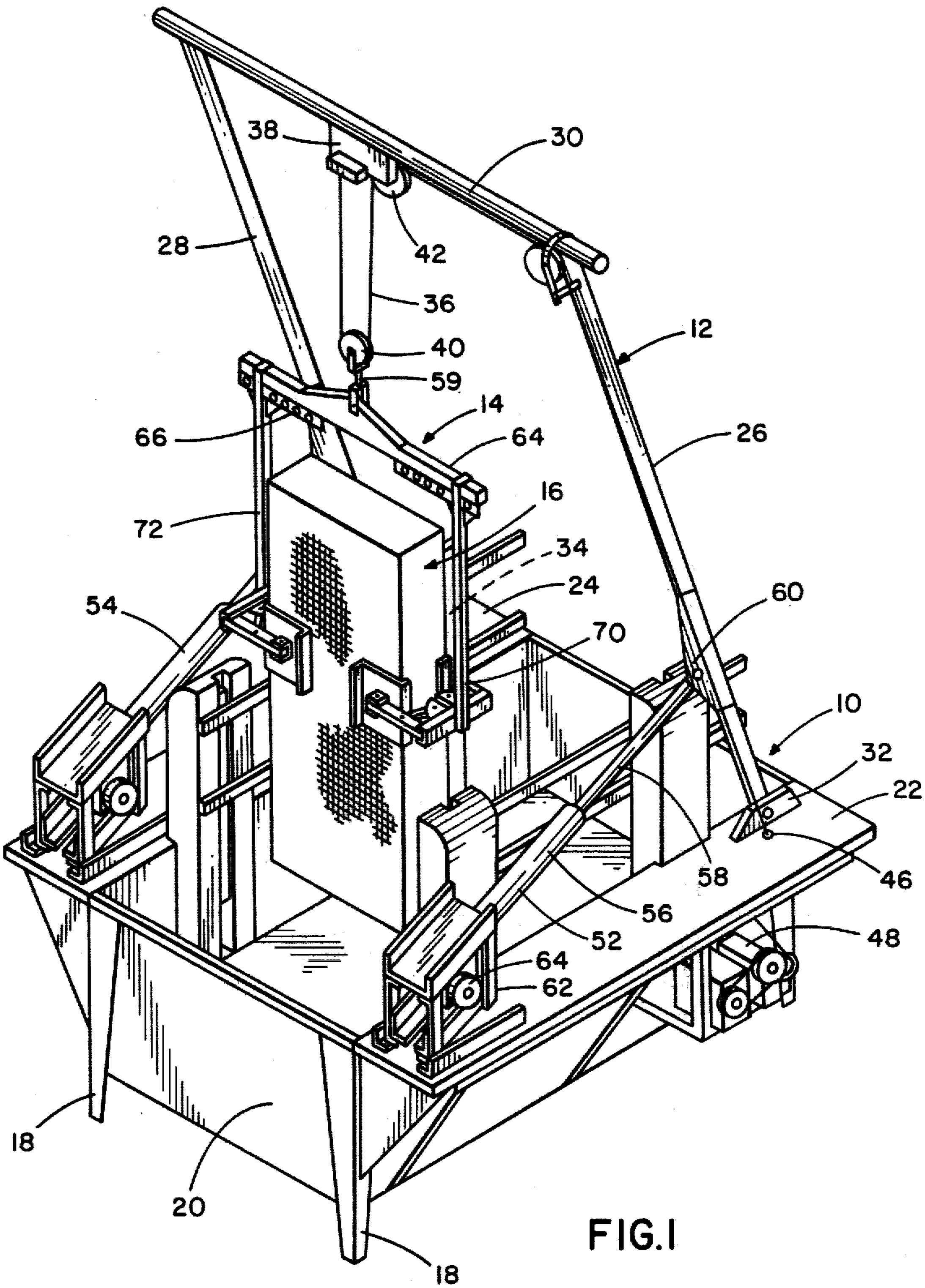
FIG. 1 is a perspective view of the improved bench and hoist mechanism of the present invention.

As shown in the figures, the radiator repair bench and hoist mechanism for the present invention is comprised of a test and repair bench 10 with a gantry mechanism 12 pivotally mounted thereon. The gantry 12 supports a radiator clamping mechanism 14 which is adapted to grip a radiator 16 particularly a heavy duty, large sized radiator 16.

The bench 10 includes four spaced legs 18 which support a rectangular reservoir 20. The reservoir 20 may be filled with water or other test fluids for testing the radiator 16. Coplanar with the top of the reservoir 20 are parallel side platforms 22 and 24. It is possible to position a center platform (not shown) over the reservoir 20 to thereby provide a workbench for the radiator or other item positioned on the platform.

The gantry 12 is comprised of spaced, parallel, upstanding legs or brackets 26 and 28 which are connected by a vertical cross member 30. Each leg 26 and 28 is attached to one side platform 22 and 24 respectively by means of a pivot bracket 32 and 34 respectively.

The radiator clamping mechanism 14 is suspended by a cable 36 from the cross member 30. More specifically, cable 36 is attached to cross member 30 from depending block 38. Cable 36 loops through a pulley 40 attached to mechanism 14. It then loops through a second idler roller 42 on member 30, and roller 44 on member 30. Cable 36 extends through opening 46 to beneath platform 22 where it is attached to a winch 48. Operation of the winch 48 thus raises and lowers the radiator clamping mechanism 14.

Each vertical leg 26 and 28 is also connected to its respective platform 22 and 24 by means of an adjustable bracket means 52 and 54, respectively. Each bracket means 52, 54 is substantially identical and each includes telescoping bracket members 56 and 58. Thus, bracket member 58 connects from a pivot assembly 60 and bracket member 56 connects a pivot assembly 62. An electric motor 64 operates to control the telescopic action of the bracket members 56 and 58 and thus the pivotal position of the gantry 12 with respect to the bench 10.

Figure 2:
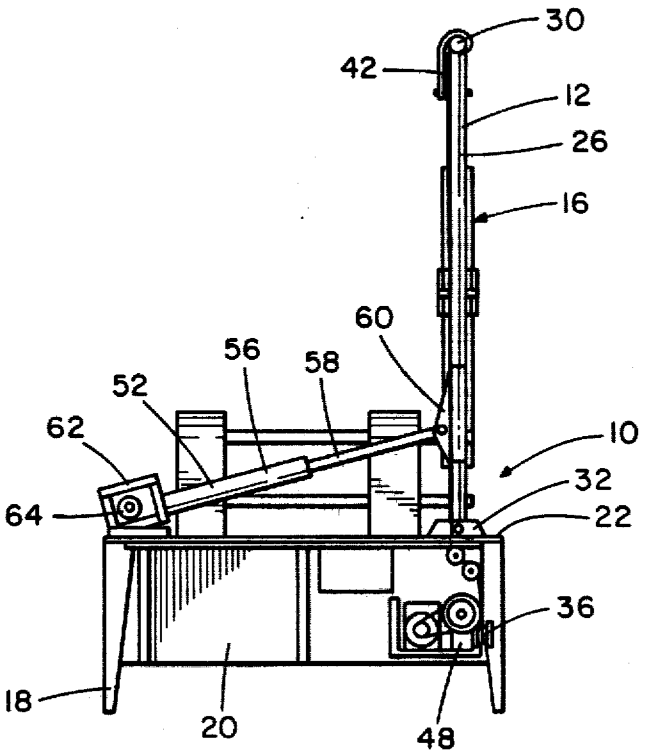
FIG. 2 is a side elevation of the improved bench and hoist mechanism of the present invention wherein the attached gantry hoist is in the vertical position.
Figure 3:
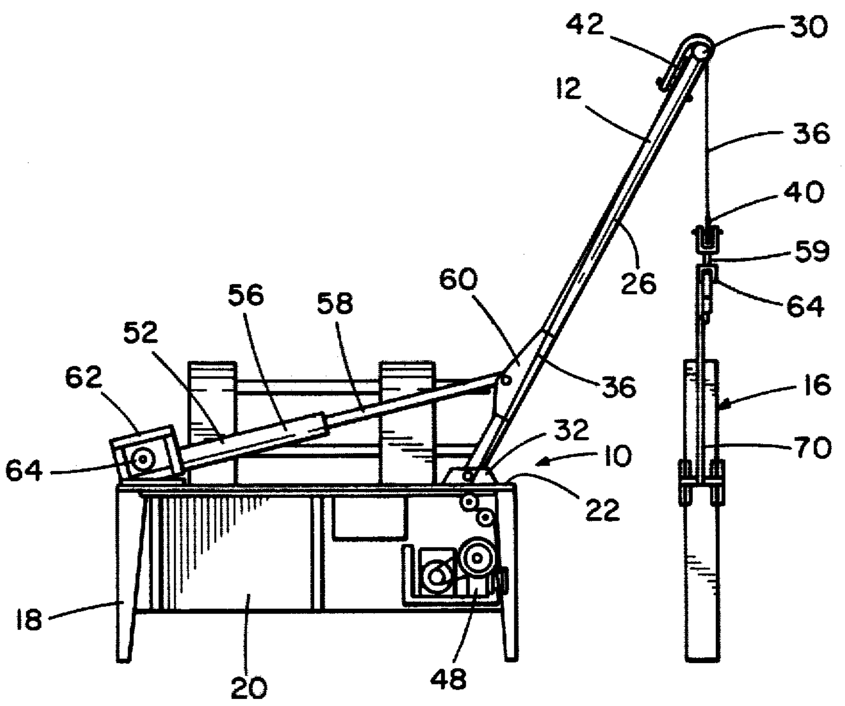
FIG. 3 is a side elevation of the hoist and bench of FIG. 2 wherein the gantry has been displaced to one of its extreme positions where a radiator is gripped by the clamping mechanism for transport to the bench.

Referring to FIG. 2, for example, the bracket means 52, 54 are extended to maintain the gantry 12 in a fixed vertical position. FIG. 3 illustrates how the bracket means 52 and 54 are further extended to move the gantry 12 through an arc and thereby transfer the clamping mechanism 14 horizontally so that it may grip a radiator 16 positioned adjacent the bench 10.

Figure 4:
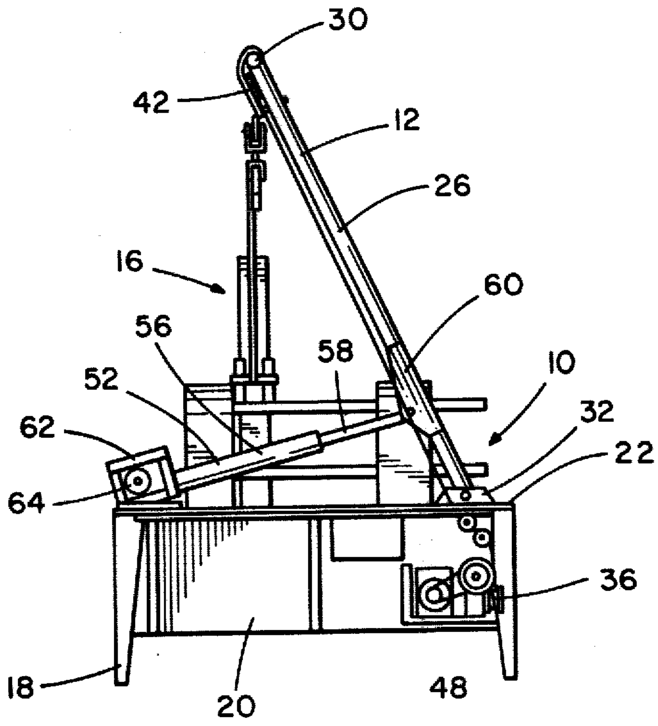
FIG. 4 is a side elevation similar to FIG. 2 wherein the gantry has been transported to a second extreme position wherein an attached radiator is supported over the test and repair bench.
Figure 5:
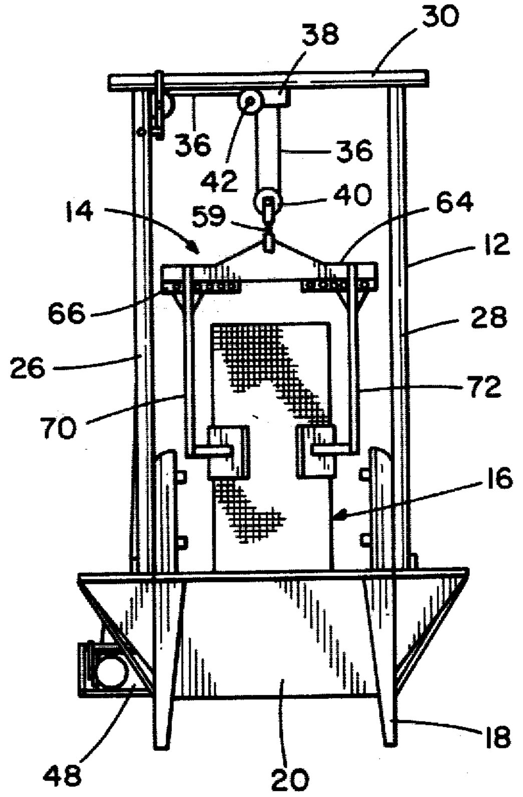
FIG. 5 is an end elevation view of the bench and hoist mechanism shown in FIG. 2.

FIG. 4 illustrates the manner in which the bracket means 52 and 54 are operated to translate the gantry 12 through an arc to thereby horizontally transport the clamping mechanism and radiator 16 to a position over the bench 10. The winch 48 may be operated to raise and lower the radiator 16 and radiator clamping mechanism 14. This motion in the vertical sense is coordinated with the horizontal motion effected by the bracket means 52, 54. A pivot bar 59 pivotally connects the pulley 40 to a crossbeam 64. Consequently, the radiator 16 may be positioned with great safety and efficiency from a position adjacent the bench 10 to a position on the bench 10 including a position within the reservoir 20.

The radiator clamping mechanism may be of any desired structure. The clamping mechanism shown in the description includes a cross beam 64 which includes a plurality of openings 66, 68 which cooperate with depending clamping devices 70, 72, respectively. The spacing of the clamping devices 70, 72 may be adjusted. Alternatively, a chain may be attached to the cross beam 64 for supporting a radiator. Application Ser. No. 922,868 filed July 7, 1978 describes another clamping mechanism which may be used in combination with the present invention.

Thus, while there has been set forth a preferred embodiment of the invention, it is to be understood that the invention is to be limited only by the following claims and their equivalents.

What is claimed is:

1. An improved radiator bench and hoist mechanism for positioning large vehicle radiators for repair comprising, in combination:
   - a bench including a generally rectangular reservoir, a planar top and at least four legs supporting the reservoir;
   - a gantry support including two, spaced, generally parallel legs, each leg having opposite ends, said gantry support also including a gantry cross member connecting one end of the legs, each of said legs having the opposite end pivotally attached to the bench substantially at the planar top and substantially adjacent one edge of the reservoir, one of said legs positioned on each side of the reservoir;
   - radiator clamp means for gripping a vehicle radiator, said clamp means being supported for vertical movement by the gantry cross member; and
   - adjustable gantry bracket means connecting each of the legs of the gantry support to the bench for adjustably pivoting the gantry cross member between a position over the reservoir and a position adjacent the bench, each of the adjustable gantry bracket means extending substantially between (1) an edge opposite said one edge of the reservoir and (2) a point between the two ends of one of the legs, whereby a radiator resting alongside of the mechanism may be gripped by the radiator clamp means, raised by the gantry support and adjustable gantry bracket means, and deposited in the reservoir.

2. The mechanism of claim 1 wherein said adjustable gantry bracket means comprises at least one telescoping bracket member connecting the bench to the leg.

3. The mechanism of claim 2 wherein said bracket means also includes motor means for adjusting the telescoping bracket member.

4. The mechanism of claim 1 wherein said radiator clamp means comprises a cross member suspended by a cable from the gantry cross member, and opposed clamp arms depending from the cross member for adjustably gripping a radiator.

5. The mechanism of claim 1 including motor means for operating the adjustable gantry bracket means.

* * * * *